United States Patent [19]

Fuchs

[11] Patent Number: 4,805,311
[45] Date of Patent: Feb. 21, 1989

[54] MEASURING DEVICE FOR THE IDENTIFICATION OF THE ENVELOPING CYLINDER OF PRECISION ROUND PARTS

[75] Inventor: Volker Fuchs, Ottobrunn, Fed. Rep. of Germany

[73] Assignee: Siemens Aktiengesellschaft, Berlin and Munich, Fed. Rep. of Germany

[21] Appl. No.: 22,005

[22] Filed: Mar. 5, 1987

[30] Foreign Application Priority Data

Mar. 21, 1986 [DE] Fed. Rep. of Germany ....... 3609722

[51] Int. Cl.$^4$ ............................................. G01B 3/34
[52] U.S. Cl. ............................. 33/178 R; 33/148 R; 33/147 R
[58] Field of Search ......... 33/DIG. 17, 178 R, 178 E, 33/517, 550, 551, 554, 148 R, 148 E, 148 F, 148 H, 147 R, 147 H, 147 M, 147 N

[56] References Cited

U.S. PATENT DOCUMENTS

| | | | |
|---|---|---|---|
| 3,940,856 | 3/1976 | Meyer | 33/178 R |
| 4,341,019 | 7/1982 | Possati | 33/148 EX |
| 4,434,557 | 3/1984 | Meyer | 33/178 R |

FOREIGN PATENT DOCUMENTS 1100487  6/1984  U.S.S.R. ............................ 33/178 R

Primary Examiner—Harry N. Haroian

[57] ABSTRACT

A gauge ring is disclosed having an inwardly disposed measuring surface which is subdivided into at least two measuring jaws, whereby the measuring jaws are connected to one another and are of one piece by a peripheral spring joint and whereby relative movements between the two measuring jaws can be transmitted onto a measuring sensor. The enveloping cylinder of precision round parts and, in particular, of light waveguide plug pins can thereby be identified with extreme precision.

22 Claims, 2 Drawing Sheets

MEASURING DEVICE FOR THE IDENTIFICATION OF THE ENVELOPING CYLINDER OF PRECISION ROUND PARTS

BACKGROUND OF THE INVENTION

The invention relates to a measuring device for identifying the enveloping cylinder of precision round parts, particularly of light waveguide plug pins.

In optical communication transmission systems using light waveguides, optical fibers are coupled together by mechanically ultra-precise plug connectors so that the two signal-carrying fiber cores meet one another coaxially with sub-micrometer range precision and, thus, guarantee a minimum signal attenuation. It is highly desirable that precision dimensions of plug pins and plug sleeves are maintained in order to conform to mnufacturing tolerances in the sub-micrometer range for diameter and cylindrical shape. Such precision is usually far beyond present measuring techniques. Another complicating factor is that the fabrication of the plug pins within the plug sleeve is just as problematical, so that no ideal or more easily measurable test method presently exists. That means that the measuring method must be selected so that functionally unimportant inadequacies of the plug pins do not lead to their rejection.

Sophisticated manipulation of conventional metrology still just barely suffice given previously fabricated plug components which did not require such a tolerance. For high-precision parts, involved measurements with high-precision universal measuring instruments of a precise measuring space were carried out on a few units or an attempt was made to "sense" the usability with the best possible gauges. An inspection of the plug pins for pluggability requires the identification of the enveloping cylinder, i.e. of the smallest possible enveloping cylinder upon consideration of the roundness and straightness deviations of a pin. This can be best implemented with a testing device which meets Taylor's principle, i.e. for a quality check, every surface element of the fitting surface of the unit under test must have a suitable surface element of the test installation residing opposite it. In the case of plug pins, this principle was previously met by means of a test using gauge rings. Gauge rings, however, are not available in the required, fine diameter gradations. Moreover, commercially available gauge rings would wear too quickly.

SUMMARY OF THE INVENTION

The object of the invention is to create a measuring device for the identification of the enveloping cylinder of precision round parts which conform to the teachings of Taylor's principle while offering the advantages of a simple measuring test.

The measuring device of the present invention provides such a test by incorporating a gauge ring which has at least two measuring jaws having inwardly disposed measuring surfaces which are sections of a cylinder and are connected to one another by a peripheral spring joint whereby a relative motion between the jaws can be transmitted to a measuring sensor.

The invention is based on the contention that the demands which have been raised can be achieved by means of a gauge ring subdivided into at least two measuring jaws. However, a prerequisite is that the measuring jaws must be of one piece and be connected to one another by means of a peripheral spring joint for achieving precisions in the sub-micrometer range. Moreover, the radius of curvature of the measuring surfaces may only be slightly greater than that of the unit under test, so that a large-area contact region is maintained. The measuring device of the present invention could thus be referred to as a "measuring gauge ring" which, for example, can employ a two-jaw or a three-jaw system.

Further advantageous developments of the present invention are set forth with particularity in the appended claims.

BRIEF DESCRIPTION OF THE DRAWINGS

Exemplary embodiments of the invention are shown in the drawings and are set forth in greater detail below, wherein.

DESCRIPTION OF THE PREFERRED EMBODIMENT

Figure 1:
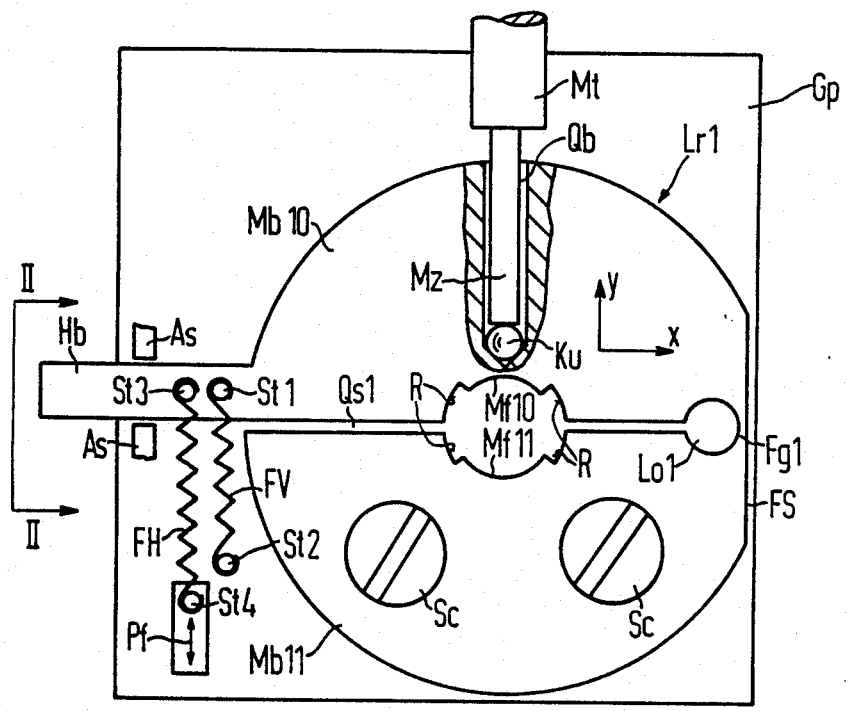
FIG. 1 is a plan view with a portion broken away of a measuring device of the present invention fashioned as a two-jaw system.

The principles of the present invention are incorporated in a gauge ring generally indicated at Lr1 in FIG. 1. A gauge ring Lr1 is arranged on a rectangular a base plate Gp and is divided into two measuring jaws Mb10 and Mb11 by a transverse slot Qs1. The lower measuring jaw Mb11 is rigidly screwed to the base plate Gp by two screws Sc, whereby a slight distance is guaranteed by corresponding eyelets or spacers on the base plate Gp. The transverse slot Qs1 ends in a first hole or aperture Lo1, whereby the remaining material between this first hole Lo1 and the outside circumference of the gauge ring Lr1 has been reduced to form a flat surface FS and a first peripheral spring joint Fg1 between the surface FS and hole Lo1. The measuring jaws Mb10 and Mb11 are thus connected to one another by the first peripheral spring joint Fg1 and are of a one-piece construction, whereby clamping imprecisions are avoided by this one-piece design and reproducable properties are guaranteed. A ball Ku is arranged in a transverse bore Qb in what is thus the movable upper measuring jaw Mb10. The jaw motion of Mb10 is then transmitted by this ball Ku onto the measuring pin Mz of a measuring sensor Mt (shown in part). A high-precision gauge bore in the center of the gauge ring Lr1 is then defined by the curved measuring surfaces Mf10 and Mf11 of the movable measuring jaw Mb10 and the fixed measuring jaw Mb11, respectively, which measuring surfaces are sections of a cylinder that are reduced by means of lateral recesses R. The exact parallelism of the center axes of the two measuring surfaces Mf10 and Mf11 is adjustable by means of a first spring referenced FV for generating a pre-measuring force and may also be adjusted by a cooperating second spring Gf shown in FIG. 2. The first spring FV and the cooperating second spring GF are affixed at one end to a lateral lever Hb on opposite sides of the movable measuring jaw Mb10, whereby the points of attack are displacable in a z-direction on a pin St1. The other end of the first spring FV is affixed to a pin St2 secured to the base plate Gp. The other end of the cooperating second spring Gf is affixed to a pin, similar to first spring FV but not shown in the drawings. As a consequence of the displaceability to the points of attack of the first spring FV and of the cooperating second spring Gf in a z-direction, a compensating torque around the x-axis is generated in addition to a pre-measuring force in a y-direction. In addition to the first spring FV generating the pre-measuring force, a third spring FH for generating the main measuring force is provided, this also being affixed to the lever Hb. In its engaged at rest condition, this third spring FH is affixed at one end to pin St3 of the lever Hb and to pin St4 at its other end with pin St4 being adjustably connected to the base plate Gp according to the arrow Pf to change the main measuring force. Two detents or stop members As are connected to the base plate Gp to limit the stroke of the lever Hb and thereby protect the sensitive first peripheral spring joint Fg1 against overstressing.

For measurement, the unit under test is first inserted between the two measuring surfaces Mf10 and Mf11 and is turned under the pressure of the pre-measuring force in order to wipe off the unavoidable residual dirt or particles on the unit. Subsequently, the main measuring force is added and the measured value is read from the display means of the measuring sensor Mt. With units under test which have elliptical roundness deviations, the enveloping cylinder can be identified as a maximum measured value by a plurality of measurements distributed over the circumference of the test unit.

With units under test whose roundness deviations are of a constant diameter form, the enveloping cylinder can no longer be acquired by the two-jaw system of FIG. 1. In this case, a three-jaw system as shown in FIG. 3 is more suitable.

Figure 3:
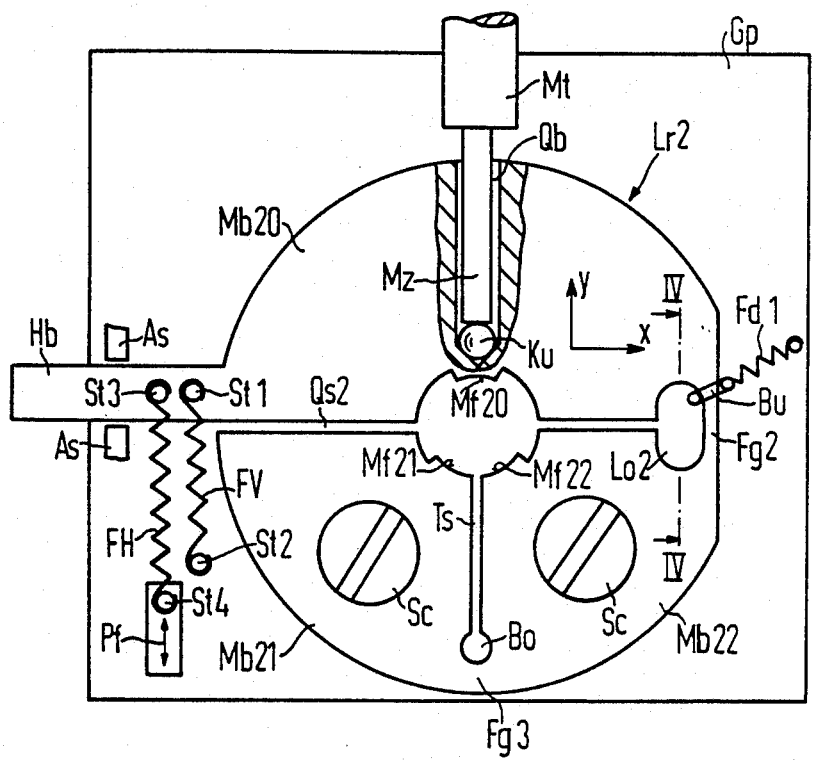
FIG. 3 is a plan view with a portion broken away of a measuring device fashioned as a three-jaw system.

The measuring device shown in FIG. 3 fashioned as a three-jaw system is constructed similar to the two-jaw system shown in FIG. 1, whereby identical parts are identified by the same reference characters.

Figure 4:
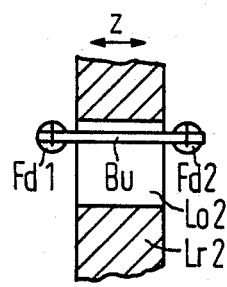
FIG. 4 is a section along line IV—IV of FIG. 3.

Given the measuring device shown in FIG. 3, the gauge ring is referenced Lr2, the upper movable measuring jaw is referenced Mb20 and the measuring surface thereof is referenced Mf20. The transverse slot Qs2 ends in the first hole or aperture Lo2 which is shaped oblong in this embodiment and forms the first peripheral spring joint Fg2 which is fashioned as a bending bar or beam. The lower measuring jaw is divided into two sub-measuring jaws Mb21 and Mb22 by a parting slot Ts having one end which terminates in a second bore or aperture Bo. These sub-measuring jaws Mb21 and Mb22 are connected to the base plate Gp by screws Sc and have measuring surfaces which are referenced Mf21 and Mf22, respectively. A second peripheral spring joint Fg3 is thereby formed between the second bore or aperture Bo and the outside circumference of the gauge ring Lr2. This second peripheral spring joint Fg3 connects the sub-measuring jaws Mb21 and Mb22 to one another to form one piece. The sub-measuring jaw Mb21 is pressed to a few micrometers closer to the sub-measuring jaw Mb22 by an auxiliary means (not shown), whereby the center axes of the two measuring surfaces Mf21 and Mf22 intersect slightly and thus produce a prism-like seat having a large-area contact region. Since the first peripheral spring joint FG2 is fashioned as a bending beam or bar, the upper, movable measuring jaw Mb20 can be retracted into a symmetrical position relative to the sub-measuring jaws Mb21 and Mb22, being retracted by a shackle Bu and by a fourth and fifth spring Fd1 and Fd2 of FIG. 4 which are arranged on either side of the device. The points of attack of the fourth and fifth springs Fd1 and Fd2 are displacable in a z-direction, i.e. the movable measuring jaw Mb20 can be turned slightly around the y-axis and, thus, the center axis of the measuring surface Mf20 can be adjusted. All other parts correspond to the embodiment shown in FIGS. 1 and 2.

Figure 2:
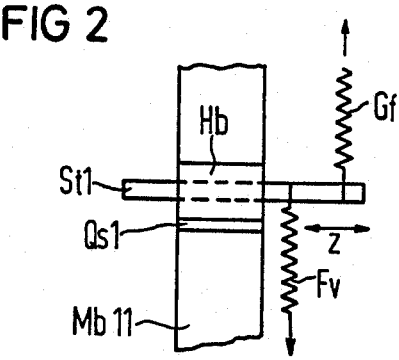
FIG. 2 is a partial end view taken on line II—II of FIG. 1.

The two measuring devices set forth above with reference to FIGS. 1 and 2 or, respectively, 3 and 4 can be provided as auxiliary measuring devices with shortened measuring surfaces and, under given conditions, can also be provided with narrower measuring jaws. The reciprocal testing of Taylor is thus also possible, i.e. the location having the smallest outside diameter can be sought and conclusions can be drawn regarding the deviations of the units under test from cylindrical form measured as a difference relative to the enveloping cylinder. Further, it is also expedient to form the measuring surfaces by means of wear-inhibiting hard metal inserts.

While two particular embodiments of the present invention have been shown and described, modifications to the present system may be made without departing from the teachings of the present invention. Accordingly, the scope of the invention is only to be limited as necessitated by the accompanying claims.

I claim:

1. A measuring device for the identification of the enveloping cylinder of precision round parts, particularly of light waveguide plug pins, said device comprising:

a gauge ring (Lr1) having at least two measuring jaws (Mb10, Mb11) said jaws having inwardly disposed, measuring surfaces (Mf10,Mf11), said measuring surfaces being sections of a cylinder;

said measuring jaws (Mb10, Mb11) being connected to one another at a first position by a first peripheral spring joint (Fg1) and being resiliently connected to one another at a second position to allow the relative motions between the at least two measuring jaws (Mb10, Mb11); and sensor means for measuring said relative motions.

2. A measuring device according to claim 1, wherein said measuring jaws (Mb10, Mb11) are divided by a transverse slot (Qs1), which terminates at one end in a first aperture (LO1) formed in said gauge ring (LR1), whereby the remaining material between said first aperture (Lo1) and the outside circumference of said gauge ring (Lr1) forms said first peripheral spring joint (Fg1).

3. A measuring device for the identification of the enveloping cylinder of precision round parts, particularly of light waveguide plug pins, said device comprising:

a gauge ring (Lr1) having two measuring jaws (Mb10, Mb11) said jaws having inwardly disposed, measuring surfaces (Mf10, Mf11), said measuring surfaces being sections of a cylinder, said measuring jaws (Mb10, Mb11) being divided by a transverse slot (Qs1), which terminates at one end in a first aperture (Lo1) formed in said gauge ring (Lr1) whereby the remaining material between said first aperture (Lo1) and the outside circumference of said gauge ring (Lr1) forms said first peripheral spring joint (Fg1), the first of said two measuring jaws (Mb11) being rigidly screwed to a base plate (Gp), the second of said two measuring jaws (Mb10) being movable and having a transverse bore (Qb);

said measuring jaws (Mb10, Mb11) being connected to one another by a first peripheral spring joint (Fg1) to allow the relative motions between the at least two measuring jaws (Mb10, Mb11); and sensor means for measuring said relative motions, said sensor means for measuring being in the form of a ball (Ku) within said transverse bore which is in contact with said second jaw (Mb10) on one side with a measuring pin (Mz) of a measuring sensor (Mt) on its opposite side.

4. A measuring device according to claim 3, wherein said second measuring jaw (Mb10) further comprises:

a lever arm (Hb) integral with said second measuring jaw (Mb10) whose motion is limited by laterally arranged stop members (As) on said base plate (Gp).

5. A measuring device according to claim 4, wherein a first spring (FV) for generating a pre-measuring force is affixed to said lever (Hb).

6. A measuring device according to claim 5, wherein the exact parallelism of the center axes of the measuring surfaces (Mf10, Mf11) are adjustable by said first spring (FV) for generating said pre-measuring force and by a cooperating second spring (Gf) affixed to said lever (Hb) on its side opposite said first spring (Fv).

7. A measuring device according to claim 6 wherein a third spring (FH) for generating a main measuring force is affixed to said lever (Hb).

8. A measuring device according to claim 7, wherein said first measuring jaw (Mb11) screwed to said base plate (Gp) is subdivided into two sub-measuring jaws (Mb21, Mb22) connected to one another by a second peripheral spring joint (Fg3).

9. A measuring device according to claim 8, wherein said two sub-measuring jaws (Mb21, Mb22) of said first measuring jaw (Mb11) are screwed to said base plate (Gp) and are subdivided by a parting slot (Ts) which terminates at one end in a second aperture (Bo), whereby the remaining material between said second aperture (Bo) and the outside circumference of said gauge ring (Lr1) forms said second peripheral spring joint (Fg3).

10. A measuring device according to claim 9 wherein said first aperture (Lo1) into which said transverse slot (Qs1) terminates is fashioned in the shape of an oblong hole.

11. A measuring device according to claim 10, wherein the position of said movable measuring jaw (Mb10) relative to said rigidly arranged sub-measuring jaws (Mb21, Mb22) is adjustable by means of at least one fourth spring (Fd1) affixed to one side of said movable measuring jaw (Mb10).

12. A measuring device according to claim 11, wherein the central axis of the measuring surface (Mf10) of said movable measuring jaw (Mb10) is further adjustable by a fifth spring (Fd2) affixed to the opposite side of said movable measuring jaw (Mb10) which cooperates with said fourth spring (Fd1).

13. A measuring device according to claim 2 wherein said ring has only two jaws, the first of said two measuring jaws (Mb11) being rigidly screwed to a base plate (Gp), the second of said two measuring jaws (Mb10) being movable and having a transverse bore (Qb), said sensor means for measuring being in the form of a ball (ku) within said transverse bore which is in contact with said second jaw (Mb10) one one side with a measuring pin (Mz) of a measuring sensor (Mt) on its opposite side.

14. A measuring device according to claim 13, wherein said second measuring jaw (Mb10) further comprises:

a lever arm (Hb) integral with said second measuring jaw (Mb10) whose motion is limited by laterally arranged stop members (As) on said base plate (Gp).

15. A measuring device according to claim 14, wherein said resilient connection of said measuring jaws (Mb10, Mb11) includes a first spring (FV) for generating a pre-measuring force affixed to said lever (Hb).

16. A measuring device according to claim 15, wherein the exact parallelism of the centre axes of the measuring surfaces (Mf10, Mf11) are adjustable by said first spring (FV) for generating said pre-measuring force and by a cooperating second spring (Gf) affixed to said lever (Hb) on its side opposite said first spring (Fv).

17. A measuring device according to claim 16, wherein a third spring (FH) for generating a main measuring force is affixed to said lever (Hb).

18. A measuring device according to claim 17, wherein said first measuring jaw (Mb11) screwed to said base plate (Gp) is subdivided into two sub-measuring jaws (Mb21, Mb22) connected to one another by a second peripheral spring joint (Fg3).

19. A measuring device according to claim 18, wherein said two sub-measuring jaws (Mb21, Mb22) of said first measuring jaw (Mb11) are screwed to said base plate (Gp) and are subdivided by a parting slot (Ts) which terminates at one end in a second aperture (Bo), whereby the remaining material between said second aperture (Bo) and the outside circumference of said gauge ring (Lr1) forms said second peripheral spring joint (Fg3).

20. A measuring device according to claim 19, wherein said first aperture (Lo1) into which said transverse slot (Qs1) terminates is fashioned in the shape of an oblong hole.

21. A measuring device according to claim 20, wherein the position of said movable measuring jaw (Mb10) relative to said rigidly arranged sub-measuring jaws (Mb21, Mb22) is adjustable by means of at least one fourth spring (Fd1 affixed to one side of said movable measuring jaw (Mb10).

22. A measuring device according to claim 21, wherein the central axis of the measuring surface (Mf10) of said movable measuring jaw (Mb10) is further adjustable by a fifth spring (Fd2) affixed to the opposite side of said movable measuring jaw (Mb10) which cooperates with said fourth spring (Fd1).

* * * * *